United States Patent [19]
Kao et al.

[11] Patent Number: 5,433,237
[45] Date of Patent: Jul. 18, 1995

[54] DEDROOPED BYPASS VALVE

[75] Inventors: Mark C. C. Kao, Elmhurst; Daniel J. McLevige, Davis, both of Ill.

[73] Assignee: Woodward Governor Company, Rockford, Ill.

[21] Appl. No.: 273,412

[22] Filed: Jul. 11, 1994

[51] Int. Cl.⁶ .............................................. G05D 7/01
[52] U.S. Cl. ........................................ 137/8; 137/117; 137/484.2; 137/484.4
[58] Field of Search ............. 137/8, 117, 484.2, 484.4, 137/484.6, 484.8

[56] References Cited

U.S. PATENT DOCUMENTS

| | | | |
|---|---|---|---|
| 2,957,488 | 10/1960 | Farkas | 137/117 |
| 4,458,713 | 7/1984 | Wernberg | 137/117 |
| 4,716,723 | 1/1988 | Ralston | 60/39.281 |
| 5,333,638 | 8/1994 | Maxwell | 137/117 X |

*Primary Examiner*—Robert G. Nilson
*Attorney, Agent, or Firm*—Leydig, Voit & Mayer Ltd.

[57] ABSTRACT

A differential pressure regulator connected in a fluid system including a bypass line and including a valve body with a high pressure inlet and a compensation inlet connected to the high pressure side of the system, a low pressure inlet, and a bypass outlet. A valve member is reciprocable within the valve housing and includes an intermediate passage between the compensation inlet and the bypass outlet, a metering port between the intermediate passage and the bypass outlet, and a compensating port between the compensating inlet and the intermediate passage. The position of this valve member controls the degree of opening of the ports. Also included is spring biasing the valve toward the closed position of the ports. The high and low pressure inlets are coupled to high and low pressure faces on the valve member, and the resulting forces act with the spring force to adjust bypass flow to achieve the substantially constant pressure drop. A compensating chamber including an inlet connected to the intermediate passage and a third pressure face is disposed such that pressure applied to the third pressure face results in a compensating force which moves the valve member toward the closed position of the ports. The pressure applied to the third pressure face is dependent on a compensating pressure drop across the compensating port. The compensating port is sized and positioned to cause a pressure drop varying as a function of valve position to compensate for increased forces tending to close the bypass port at high bypass flows.

16 Claims, 3 Drawing Sheets

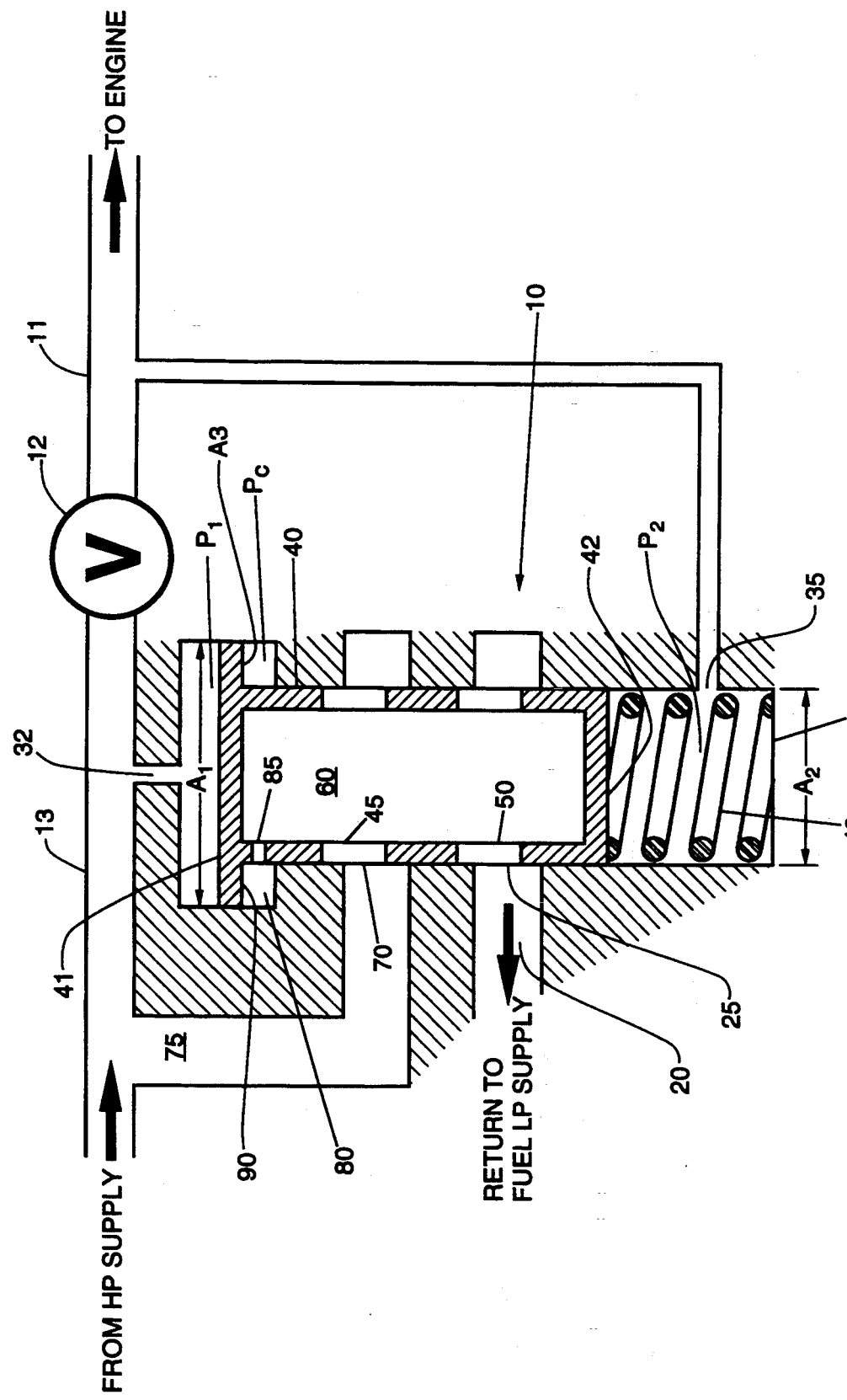

DEDROOPED BYPASS VALVE

FIELD OF THE INVENTION

The invention relates generally to a pressure regulator and more particularly to an improved bypass differential pressure regulator for maintaining a substantially constant pressure drop across the high and low pressure sides of a fluid pressure system having a high pressure bypass line.

BACKGROUND OF THE INVENTION

A typical bypass-type differential pressure regulator is used to maintain a constant pressure drop across the inlet and outlet of a metering valve forming a part of a fluid pressure system. Such a typical regulator comprises a piston-like valve member adapted to reciprocate within a valve housing having high and low pressure ports communicating with high and low pressure sides of the system. The valve housing also includes a bypass port for bypassing pressure fluid from the high pressure side of the system to the bypass line. High pressure fluid admitted into the housing biases the valve member to a position tending to open the bypass port, while the low pressure fluid admitted into the housing biases the valve member to a position tending to close the bypass port. Typically, a spring coacts with the low pressure fluid to bias the valve member to the closed position. According to this arrangement, an increase in the high pressure, or a decrease in the low pressure, causes the valve member to shift to a position wherein it bypasses more flow from the high pressure side of the system to the bypass line, thereby maintaining a substantially constant pressure drop across the high and low pressure sides of the system. Conversely, a decrease in the high pressure or an increase in the low pressures results in the valve member being shifted to bypass less flow and thus maintain the substantially constant pressure drop.

Such prior regulators, however, often encounter difficulty in reliably maintaining a constant pressure drop over a wide range of flow rates. In particular, an undesirable increase in the pressure drop across the metering valve generally occurs at high bypass flows. As the bypass flow increases and the valve member opens, the biasing force exerted by the spring becomes progressively higher. As a result, the valve member encounters progressively greater resistance against movement to an open position. Also, increasing fluid reaction forces further resist opening of the valve member at high flows. As a result, the pressure drop across the system tends to increase at high bypass flows rather than remaining at a desired constant value.

One method of dealing with this problem can be found in U.S. Pat. No. 4,458,713 to Wernberg. In that patent, an additional force tending to close the valve was included along with the low pressure, the spring force, and the fluid reaction forces. This additional force, was designed to decrease at high bypass flows to compensate for the increased closing force caused by the spring and the fluid reaction forces at high bypass flows. In that patent, an orifice is created in the piston face in the high pressure chamber. This orifice communicates with an internal passage in the valve member. The bypass flow is through the orifice and passage, which communicates with the bypass port. As the bypass flow increases, the orifice introduces an increasing pressure drop between the high pressure chamber and the passage. Thus, the pressure $P_c$ in the passage decreases for increasing bypass flow. This same pressure is communicated through small passages to chambers which act against a face of the piston in a direction to reduce bypass flow. This force acts along with a spring force, the reaction force, and the force on a low pressure face of the piston caused by the low pressure side of the system to balance the pressure of the high pressure side of the system acting against a high pressure area of the piston. As bypass flow increases, $P_c$ decreases, reducing this counterbalancing force and allowing a given high pressure to open the bypass valve further than would be the case without this compensation.

In this way, the regulator of the '713 patent is designed to maintain a constant pressure across the metering valve. Even so, at high bypass flows, the pressure across the metering valve tends to be too small. This is due to the compensating force becoming too small at these flows. Thus, while the '713 patent gives a more constant pressure drop than previous regulators, that pressure drop is not constant for all bypass flows and pressures.

SUMMARY OF THE INVENTION

Accordingly, it is a general aim of the present invention to provide an improved pressure regulator, and specifically a bypass type differential pressure regulator which is capable of maintaining a more uniform pressure drop across a fluid pressure system than prior regulators.

A more detailed object of the invention is to achieve the foregoing by providing a bypass-type differential pressure regulator which senses the bypass flow, and as the bypass flow rate increases, compensates for the increased spring and fluid reaction forces by applying a compensating force that varies substantially linearly with increased bypass flow velocity. In the practice of the invention, by automatically reducing the closing pressure on the valve member linearly as the bypass flow increases, the regulator compensates for the progressively higher resistance of the bias spring and the fluid reaction forces and is capable of more accurately maintaining a constant pressure drop for all bypass flow rates and pressures.

It is a feature of the present invention that the compensating pressure applied to the valve member is set both by the variable size of a compensating port, and the bypass flow rate. In turn, the size of the compensating port is itself regulated by the flow rate.

In accordance with the present invention, there is provided a differential pressure regulator which maintains a substantially constant pressure across the high and low pressure sides of a fluid pressure system that includes a high pressure bypass port. The regulator includes a valve body with a high pressure inlet and a compensation inlet connected to the high pressure side of the system. A low pressure inlet is connected to the low pressure side of the system, and a bypass outlet is connected to the bypass line. The regulator also includes a valve member that is reciprocable within the valve housing and which includes an intermediate passage between the compensating inlet and the bypass outlet. The valve member also includes a metering port between the intermediate passage and the bypass outlet. Also included is a compensating port disposed between the compensating inlet and the intermediate passage.

The position of this valve member controls the degree of opening of the metering port and the compensating port. A spring biases the valve member toward the closed position of the ports. The high and low pressure inlets are coupled to high and low pressure faces on the valve member. The resulting forces act along with the spring force to adjust the position of the valve to adjust bypass flow to achieve a substantially constant pressure drop across the regulator. Also included is a compensating chamber which has an inlet connected to the intermediate passage and a third pressure face disposed such that pressure applied to the third pressure face results in a compensating force which moves the valve member toward the closed position of the ports. The pressure applied to the third pressure face is dependent on a compensating pressure drop across the compensating port. The compensating port is sized and positioned to cause a pressure drop which varies linearly as a function of valve position to compensate for increased forces tending to close the bypass port at high bypass flow rates.

BRIEF DESCRIPTION OF THE DRAWINGS

FIG. 1 is a schematic representation of a fluid pressure system including a pressure regulator according to one embodiment of the invention;

DETAILED DESCRIPTION OF THE PREFERRED EMBODIMENT

Figure 3:
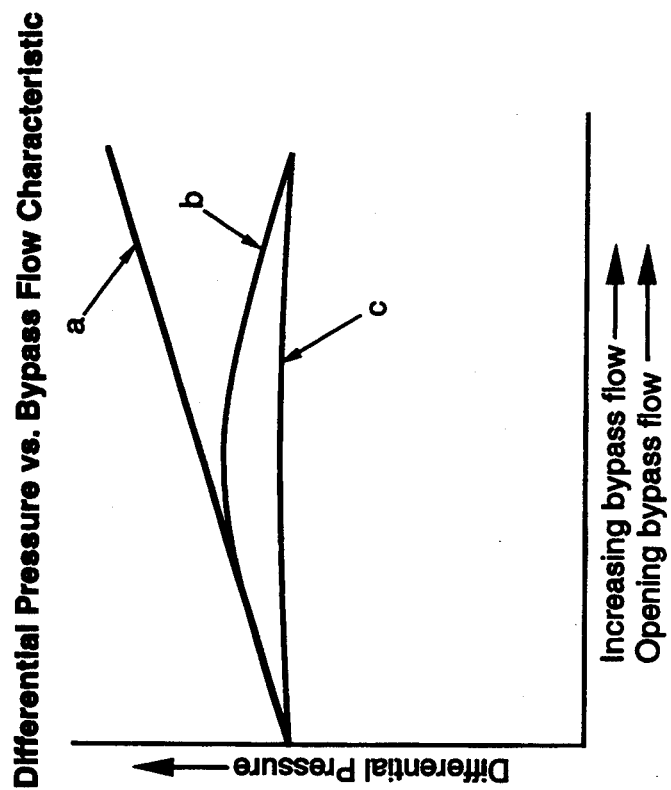
FIG. 3 is comparative a graph showing the differential pressure drop across a metering valve in fluid pressure systems using different pressure regulators including one according to one embodiment of the invention.

An illustrative example of an improved bypass-type pressure regulator 10 according to the invention is shown in FIG. 1. For purposes of this illustration, the pressure regulator 10 is schematically shown in the drawing as being incorporated in a fluid pressure system for delivering pressurized liquid fuel via line 11 to an aircraft engine. The fuel is supplied to the line 11 at a regulated rate by way of a metering valve 12 which communicates with a high pressure supply line 13. High pressure fuel is typically supplied to the high pressure supply line 13 from a high pressure (HP) supply such as a gear-type positive displacement pump (not shown).

In order to supply fuel to the low pressure discharge line 11 at a regulated rate, a substantially constant drop must be maintained across the metering valve 12 regardless of the flow rate through the valve. Pressure regulator 10 is included in the system for this purpose. The regulator 10 is connected across fuel valve 12 and maintains the constant pressure drop across that valve by selectively bypassing high pressure fuel from high pressure line 13 to a bypass line 20. That is, as the pressure in line 13 increases relative to the pressure in line 11, regulator 10 is adapted to bypass more fuel via line 20, thus reducing the pressure in line 13. Conversely, if the pressure in line 11 rises relative to the pressure in line 13, pressure regulator 10 reduces the flow into bypass line 20 thereby increasing the pressure in line 13. In this manner, regulator 10 maintains a substantially constant pressure drop across metering valve 12. According to a significant aspect of the invention, regulator 10 includes compensation elements which allow the regulator to maintain the substantially constant pressure drop across metering valve 12 for a wide range of bypass flows and pressures.

The regulator 10 comprises a valve housing 30 including a high pressure inlet 32 in communication with high pressure supply line 13. Housing 30 also includes a low pressure inlet 35 connected to the low pressure line 11. A valve member 40 is housed within valve housing 30 for reciprocating movement with respect thereto. It is the position of this valve member 40 with respect to valve housing 30 which determines the amount of high pressure fuel from line 13 which is passed to the bypass line 20. Accordingly, the regulator 10 will be referred to herein as having a range of bypass positions from low bypass flow to high bypass flow. High pressure fluid admitted into the high pressure inlet 32 acts against a high pressure face 41 on the upper end of the valve member 40. This pressure results in a force which tends to shift the valve member downwardly to a position allowing increased bypass flow from the high pressure line 13 to the bypass line 20. At the same time, low pressure fluid admitted through low pressure inlet 35 acts against a low pressure face 42 on the lower end of the valve member 40, which results in a force that tends to shift the valve member upwardly so as to reduce the bypass flow from the high pressure line 13 to the bypass line 20. A coil spring 43 is compressed in the housing 30 between the low pressure face 42 and the lower end of the housing. The force of this compression spring also acts to shift the valve member upwardly and thus to reduce the bypass flow to the bypass line 20.

According to this arrangement, the valve member 40 is shifted downwardly when the pressure $P_1$ in high pressure line 13 increases relative to the pressure $P_2$ in the low pressure line 11. Of course, such relative change can occur either by pressure $P_1$ increasing or by pressure $P_2$ decreasing. In either case, the downward movement of valve member 40 causes an increase in the bypass flow from the high pressure line 13 to the bypass line 20 so as to reduce the pressure $P_1$. In this way, regulator 10 maintains a substantially constant pressure drop $P_1-P_2$ across the metering valve 12. Conversely, if the pressure $P_1$ decreases relative to $P_2$, the valve member 40 shifts upwardly which decreases the bypass flow from high pressure line 13 to bypass line 20. This raises the pressure $P_1$ to maintain the pressure drop $P_1-P_2$ at substantially the same constant value.

The action of the biasing spring 43 in such an arrangement shifts the pressure drop $P_1-P_2$ away from the constant value as the valve member shifts downwardly. This is due to the fact that the resistance force offered by spring 43 increases with the stroke of valve member 40. Thus, as valve member 40 moves downwardly and causes an increased bypass flow into bypass line 20, the spring 43 progressively resists downward movement of the valve. This increased resistance causes the relationship $P_1-P_2$ to change. Additionally, fluid reaction forces increase as the bypass flow increases. These fluid reaction forces also progressively resist downward movement of the valve at high bypass flows. Because of these increased upward forces for large bypass flow, a valve member having the previously-described configuration would tend to deliver too little bypass flow at high bypass flow conditions. As a result, the pressure drop $P_1-P_2$ tends to increase for increased bypass flow.

In accordance with the invention, the pressure regulator 10 is constructed to compensate for the increasing resistance exerted by the spring and the fluid reaction forces which occur at higher bypass flow. This compensation is in the form of a compensation force which acts in the same direction as the spring force. For low bypass flows, this compensating force has a relatively large value, while it has a smaller value for high bypass flow. As a result, the progressively increasing resistance exerted by the spring and fluid reaction forces is offset by this progressively reducing compensating force.

We have recognized that both the fluid reaction force and the spring force increase substantially linearly for increasing bypass flow. Because of this, and according to a further aspect of the invention, the valve member 40 is constructed to provide a compensating force that varies substantially linearly with increasing bypass flow. This linearly varying compensating force thus accurately compensates for the substantially linearly varying and increasing spring force and fluid reaction forces. Because of this compensation, and its substantially linear nature, the pressure drop $P_1-P_2$, instead of increasing as bypass flow increases, remains at a more substantially constant value for widely varying bypass flow rates and bypass pressures.

To provide for fluid communication between the high pressure line 13 and bypass line 20, valve member 40 includes a compensating port 45 and a metering port 50, both of which are in communication with an intermediate passage 60 formed in valve member 40. Compensating port 45, depending upon the position of valve member 40 relative to valve housing 30, is in fluid communication with a compensation inlet 70. This compensation inlet 70, in turn, is in fluid communication with a secondary high pressure line 75 connected to high pressure line 13. Similarly, metering orifice 50, depending upon the position of valve member 40, is in fluid communication with a bypass outlet 25. Bypass outlet 25 is in constant fluid communication with the bypass line 20. Preferably, both compensation inlet 70 and bypass outlet 25 are annular ports as shown in FIG. 1. Further, the compensating port 45 and metering port 50 are preferably comprised of angularly spaced orifices formed within the valve member 40. As mentioned, the position of valve member 40 relative to valve housing 30 determines the amount of registration between the compensating port 45 and the compensation inlet 70. Similarly, the position of valve member 40 determines a level of registration between the metering port 50 and the bypass outlet 25. Assuming the compensating port 45 is at some level of registration with compensation inlet 70, and that metering port 50 is at some level of registration with bypass outlet 25, high pressure fuel from the secondary high pressure line 75 is bypassed by the regulator 10 to the bypass line 20. The cross sectional area of the compensating port 45, to be discussed in greater detail below, is smaller than the cross sectional area of the intermediate passage 60. As a result, a pressure drop is introduced between secondary high pressure line 75 and the intermediate passage 60 formed within valve member 40. This pressure drop varies according to the position of valve member 40 relative to the valve housing 30, assuming a constant bypass flow. Of course, bypass flow is not constant, and an increased bypass flow will cause an increased pressure drop assuming a constant position of the valve member 40 with respect to the valve housing 30.

The pressure within intermediate passage 60, as determined by the pressure drop across compensating port 45, is communicated to a compensating chamber 80 through an opening 85 formed radially through the valve member 40. Preferably, the compensating chamber 80 is annular, and the opening 85 comprises several angularly spaced openings formed through the valve member 40. One side of compensating chamber 80 is defined by one side of a radially projecting land 90 formed around the upper end of the valve member 40. The portion of land 90 forming one side of the compensating chamber 80 forms a pressure face against which the pressure in intermediate passage 60 acts. This results in an upward force tending to close off the compensating and bypass ports to reduce bypass flow. The pressure exerted on the pressure face is determined by the pressure drop across the compensating port 45. Since it is the upward force on this pressure face which give regulator 10 the ability to compensate for increased closing forces at high bypass flows, the pressure drop across compensating port 45 will be referred to herein as a compensating pressure drop.

According to this arrangement, the pressure $P_1$ admitted through high pressure inlet 32 acts against an area $A_1$ which corresponds to the area corresponding to the diameter of the land 90. Pressure $P_1$ acting on area $A_1$ tends to shift the valve member downwardly under the influence of the force $P_1A_1$. At the same time, pressure $P_2$ which has been admitted through low pressure inlet 35 acts against the low pressure face 42 having an area defined as $A_2$. Thus, a force $P_2A_2$ resists the downward force $P_1A_1$, and urges the valve member 40 upwardly. As mentioned previously, the upward force $P_2A_2$ is summed with an upwardly-acting force from the compression spring 43, which will be referred to herein as $F_s$. Also, an upwardly-directed fluid reaction force $F_r$ also tends to urge the valve member upwardly. According to the invention, a further upwardly-acting compensating force $F_c$ is exerted on the valve member by virtue of the pressure $P_c$ being transmitted from the intermediate passage 60 to the compensating chamber 80 and acting against the lower side of the land 90. This area of the land 90 will be referred to herein as $A_3$, and thus the magnitude of the compensating force will be equal to $P_cA_3$.

Considering all of these forces, the downward force tending to increase flow through the bypass outlet 25 is $P_1A_1$, while the combined upward force acting on the valve member and tending to close the bypass port is $P_2A_2+P_cA_3+F_s+F_p$. The balance forces on the valve member, may thus be expressed as:

$$P_1A_1=P_2A_2+P_cA_3+F_s+F_r \qquad (1)$$

The compensating port 45 and the metering port 50 are disposed such that the compensating port 45 will crack before the metering port 50. Thus, at some point there is a steady state where the compensating port 45 is open, but the metering port is not, and thus there is no bypass flow. At this steady state condition, the pressure $P_c$ in the compensating chamber 80 is equal to the high pressure $P_1$, the fluid reaction force $F_p$ is zero and the force balance equation is:

$$P_1A_1=P_2A_2+P_1A_3+F_s \qquad (2)$$

According to this embodiment, the area $A_3$ is equal to the area $A_1$ minus the area $A_2$, thus, equation 2 may be rewritten as:

$$P_1 A_1 = P_2 A_2 + P_1 (A_1 - A_2) + F_s \qquad (3)$$

Equation 3 may be simplified and rewritten as $$P_1 - P_2 = \frac{F_s}{A_2} \qquad (4)$$

As previously discussed, the purpose of regulator 10 is to maintain the value $P_1-P_2$ at a constant value. For the steady state case just considered, this occurs, since both $F_s$ and $A_2$ are constant. However, and as mentioned previously, $F_s$ is not a constant over the entire range of travel of the valve member. Furthermore, as the bypass port 25 opens, the upwardly-acting fluid reaction forces $F_r$ increases. As mentioned, both of these forces vary substantially linearly for increasing bypass flow, as determined by the position of the valve member 40.

The pressure regulator 10, according to the invention, compensates for the increase in these forces $F_s$ and $F_r$. As the valve member moves away from its steady state position, and shifts downwardly to permit a bypass flow through the metering port 50 and the bypass outlet 25, a compensating port pressure drop results from the flow through the compensating port 45. As a result, the pressure $P_c$ transmitted to the compensating chamber 80 is also reduced.

For increased bypass flows, the pressure $P_c$ continues to diminish, thus reducing the total upward force acting on the valve member and compensating the increased upward forces due to increasing $F_s$ and $F_r$.

According to a further significant aspect of the invention, this continuing reduction in $P_c$ for increased bypass flow is programmed so that the relationship between increased bypass flow and decreased $P_c$ is substantially linear. This is advantageous since, as discussed above, the increasing forces for which $P_c$ compensates ($F_s$ and $F_r$) increase linearly with increasing bypass flow or downward valve position. This substantially linear decrease in $P_c$ for increasing bypass flow is achieved by making the size of compensating port 45 a function of the bypass flow. For an incremental downward movement of the valve member 40 and thus an incremental increase in bypass flow, the pressure drop across an orifice of fixed size would have a certain value. According to this invention, however, the incremental downward movement of the valve member 40 also incrementally increases the size of compensating port 45. This increase in the size of the compensating port reduces the amount of the pressure drop across the port as compared to an orifice of fixed size. It is this action of pressure regulator 10 which gives an substantially linear relationship between the compensating force exerted on the land 90 by the pressure $P_c$, and the rate of bypass flow. Since a linearly decreasing $P_c$ is used to offset linearly increasing forces $F_s$ and $F_r$, pressure regulator 10 effectively maintains a substantially constant pressure drop $P_1-P_2$ across the metering valve 12 through the entire range of bypass flows and pressures.

Figure 2:
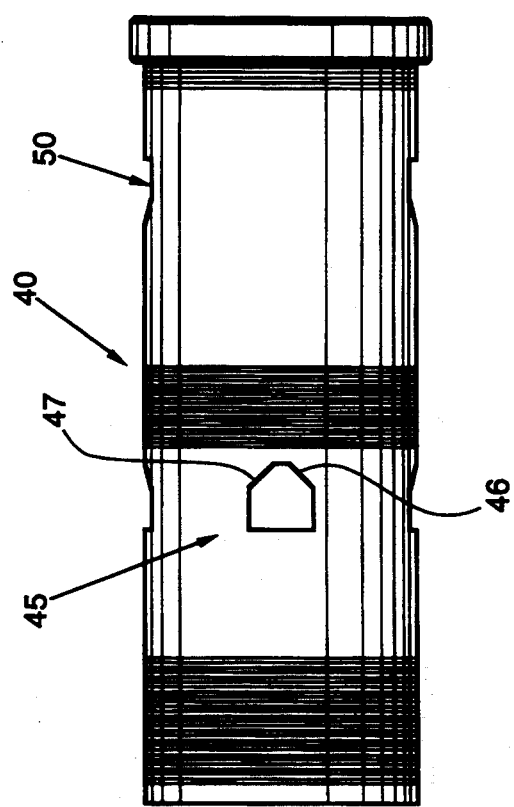
FIG. 2 is a perspective view of a valve member for a pressure regulator according to an embodiment of the invention.

In order to achieve the substantially constant pressure drop across the valve 12, the areas of the compensating port 45, and the metering port 50 must be correlated with one another, and with the known force of the spring 43. Further, and according to another aspect of the invention, the areas and shapes of the compensating port 45 and the metering port 50 can be optimized for each specific application. For example, the compensating port 45 may be rectangular, such that the relationship between the position of the valve member 40 and the area of port 45 exposed to the compensation inlet 7 is linear. Alternatively, instead of having the compensating port 45 be of a simple rectangular configuration, a more complex configuration, such as that shown in a representative valve member in FIG. 2 may be used for the compensating port 45. According to that configuration, the shape of the compensating port 45 is rectangular over most of the range of travel of valve member 40. In that range the valve position/compensating port area relationship is linear. As the valve member moves to a high bypass flow position, however, the port may be necked-down as at the angular side walls 46 and 47. In this region of the port 45, the valve position/compensating port area relationship becomes non-linear. Other shapes of both the compensating port 45 and the metering port 50 may be used and optimized for specific applications. Generally, the purpose of such optimization of the shapes of the ports will be to maintain the constant pressure drop across the metering valve 12. However, it may also be desirable in certain circumstances to shape the ports to introduce a nonconstant drop across metering valve 12 for certain specified conditions.

Thus, there has been disclosed a pressure regulator 10 which is uniquely designed to have the advantageous feature of maintaining a substantially constant pressure drop across a metering valve in a fluid delivery system. FIG. 3 is a comparative graph showing the differential pressure across a metering valve over a range of fuel flows in fuel delivery system using different pressure regulators including a regulator 10 according to the invention. The first curve, designated "a" is for a pressure regulator without any compensation. The second curve "b" shows a pressure regulator employing compensation as shown in the Wernberg '713 patent. The remaining curve "c" shows a pressure regulator in accordance with the invention. As shown by these idealized curves, the pressure regulator of the present invention, by virtue of a substantially linear relationship between valve position and the compensationg pressure drop, offers a substantially constant pressure drop across a metering valve.

Figure 4:
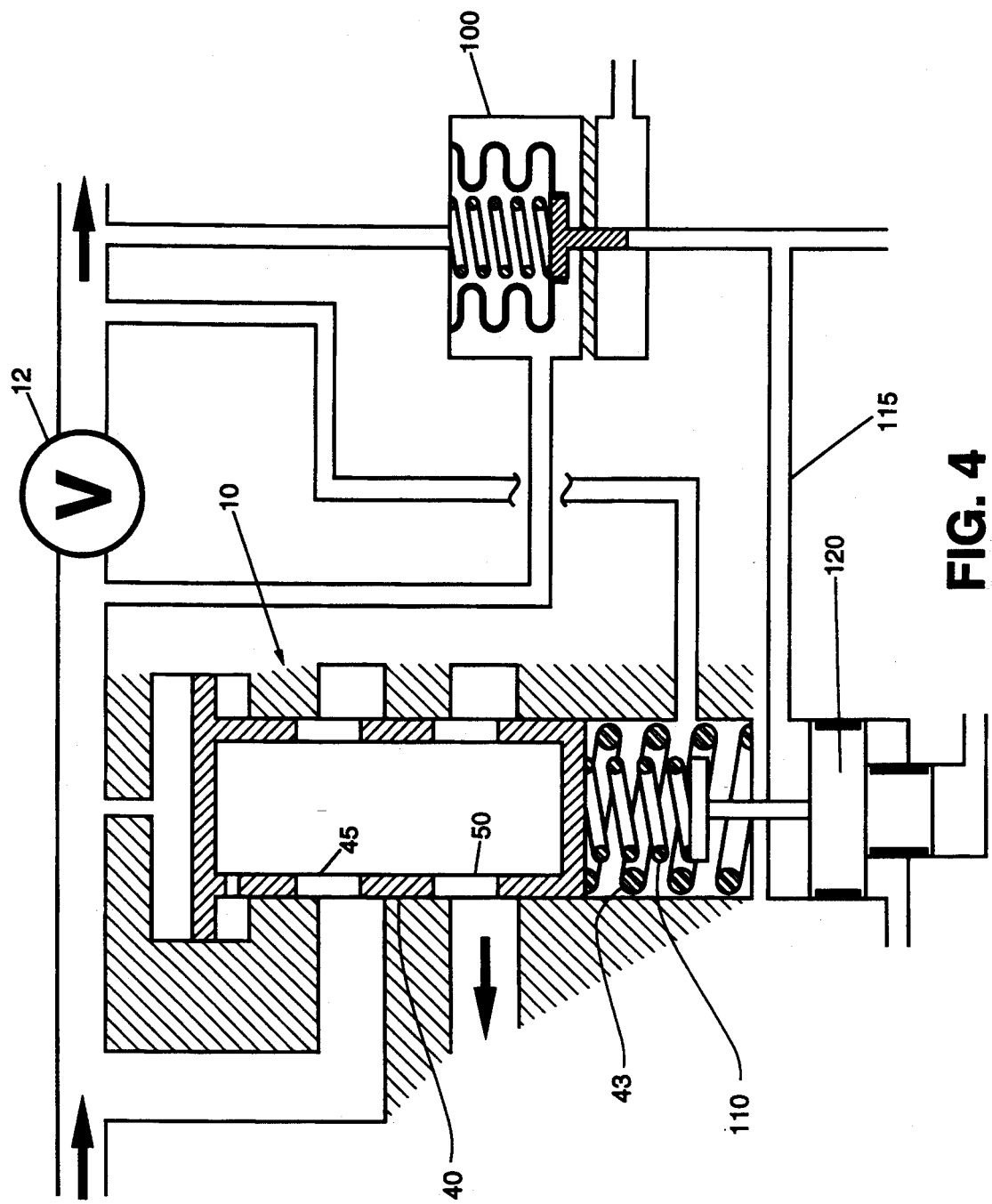
FIG. 4 is a schematic representation of a fluid pressure system including a pressure regulator according to one embodiment of the invention in combination with a differential pressure amplifier.

Furthermore, a pressure regulator according to the present invention may advantageously be used in combination with other devices for maintaining a constant pressure drop across a metering valve. In FIG. 4, the pressure regulator 10 according to the present invention is shown used in conjunction with a bellows 100 and trim piston 120, forming an amplifier for amplifying the pressure differential across the metering valve as seen by the regulator 10. The pressure differential across the metering valve 12 is applied to the bellows 100. The pressure output from bellows 100, which varies with the differential pressure, is applied to a trim piston 120 via line 115. For an increase in high pressure relative to low pressure, the trim piston moves downwardly, thus tending to move valve member 40 to a position of higher bypass flow. In designing pressure regulator 10, the shape and area of the compensating port 45 and metering port 50 are correlated with the spring force of spring 43 and trim valve spring 110. In this way, a more nearly constant pressure drop can be achieved across valve 12.

What is claimed is:

1. A differential pressure regulator for maintaining a substantially constant pressure across high and low pressure sides of a fluid system, having a high pressure bypass line, over a substantial range of flow conditions, the regulator comprising, in combination:

a valve housing having a high pressure inlet and a compensation inlet connected to the high pressure side, a low pressure inlet connected to the low pressure side, and a bypass outlet for bypassing high pressure flow to the bypass line, a valve member reciprocable within the valve housing and including a metering port for communicating with the bypass outlet, a compensating port for communicating with the compensation inlet, and an intermediate passage connecting the ports, the position of the valve member controlling the degree of opening of the ports, a biasing member for biasing the valve member toward the closed position of the ports, the high pressure inlet and low pressure inlet being coupled to opposed high and low pressure faces of the valve member to act in conjunction with the force exerted by the bias member and thereby to position the valve member to adjust bypass flow to achieve a substantially constant pressure drop across the regulator, a compensating chamber having an inlet connected to the intermediate passage and a third pressure face disposed such that pressure applied to the third pressure face results in a force which moves the valve member toward the closed position of the ports, the pressure being dependent on a compensating pressure drop across the compensating port, and the compensating port being sized and positioned to cause a compensating pressure drop which varies as a function of valve position to compensate for increased forces tending to close the bypass port at high bypass flow rates.

2. The pressure regulator of claim 1, wherein the compensating pressure drop varies substantially linearly with valve position.

3. The pressure regulator of claim 2, wherein the shape of the compensating port is optimized to achieve the linearly varying compensating pressure drop.

4. The pressure regulator of claim 3, wherein the compensating port is shaped such that the relationship between valve member position and compensating port area is linear over the range of travel of the valve member.

5. The pressure regulator of claim 1, wherein the compensating port is shaped such that the relationship between valve member position and compensating port area is non-linear over the range of travel of the valve member.

6. The pressure regulator of claim 5, wherein the compensating port is generally rectangular and includes a necked-down region having tapering sides, the necked-down region being exposed to the compensation inlet at high bypass flows.

7. The pressure regulator of claim 2, wherein the shape of the metering port is optimized to achieve the linearly varying compensating pressure drop.

8. The pressure regulator of claim 2, wherein a secondary high pressure line is connected between the high pressure side of the system and the compensation inlet.

9. The pressure regulator of claim 2, wherein the valve member includes a land, the high pressure face and the third face being at least partially disposed on opposite sides of the land.

10. The pressure regulator of claim 9, wherein the combined area of the low pressure face and the third pressure face is equal to the area of the high pressure face.

11. The pressure regulator of claim 2, wherein the compensating port cracks before the metering port.

12. A pressure regulation system including the pressure regulator of claim 2, the system also including a pressure amplifier for amplifying the differential pressure between the high and low pressure sides of the fluid system, the amplified pressure being applied to the low pressure face of the valve member.

13. The pressure regulation system of claim 12, wherein the pressure amplifier comprises:

a bellows valve connected between the high and low pressure sides of the fluid system, the bellows valve having a pressure output that varies with the differential pressure; and a trim piston responsive to a decrease in the pressure output to exert a force on the valve member tending to close the ports.

14. A differential pressure regulator for maintaining a substantially constant pressure between high and low pressure sides of a fluid pressure system including a high pressure bypass line, comprising in combination:

a housing including a high pressure inlet and a compensation inlet connected to the high pressure side, a low pressure inlet connected to the low pressure side, and a bypass outlet connected to the bypass line;

a valve member reciprocable within the valve housing and including high and low pressure faces communicating with the high and low pressure inlets;

a compensating port and a metering port disposed in the valve member and communicating with an intermediate passage for passing bypass flow from the high pressure side to the bypass line, the ports being positioned in the valve member such that the level of registration between the compensating port and the compensation inlet and between the bypass port and the bypass outlet is determined by the position of the valve member within the housing;

a compensating chamber between the valve housing and the valve member in communication with the intermediate passage and including a third pressure face opposite the high pressure face;

a bias member disposed between the valve housing and the low pressure face;

whereby the valve member position is determined by the forces on the low pressure face, the high pressure face, and the third pressure face, the valve member position determining the bypass flow and the pressure in the intermediate passage.

15. A method of compensating a differential pressure regulator connected to maintain a constant pressure between the high and low pressure sides of a fluid system including a bypass line, wherein a spring force and a force due to the low pressure tend to move the regulator to a position of less bypass flow, and a force due to the high pressure tends to move the valve to a position of higher bypass flow, the spring force and fluid reaction forces increasing with bypass flow, the method comprising:

generating a compensating pressure which linearly decreases as a function of bypass flow;

applying the compensating pressure to a pressure face to generate a compensating force tending to close the valve;

summing the compensating force with the spring force, the fluid reaction forces and the low pressure force to linearly compensate for the increasing spring and fluid forces at high bypass flows.

16. The method of claim 15 wherein the step of generating a compensating pressure comprises passing the bypass flow through a compensating port into a passage in communication with the pressure face and varying the size of the compensating port according to the bypass flow so that the pressure drop across the compensation port sets the compensating pressure.

* * * * *